United States Patent Office 3,319,603
Patented May 16, 1967

3,319,603
APPARATUS FOR THE APPLICATION OF LIQUID SUBSTANCES, PARTICULARLY ADHESIVES
Willy Hesselmann, Herbsstrasse 27, Rosenheim, Upper Bavaria, Germany
Filed Oct. 28, 1963, Ser. No. 319,346
Claims priority, application Germany, Oct. 26, 1962, P 30,456
8 Claims. (Cl. 118—410)

The invention relates to apparatus for the application of liquid substances, and particularly of adhesives, to articles in the form of sheets or bands. The apparatus consists of a hollow application tool in whose wall at least one discharge opening, adapted to be covered with an external foil, is provided.

It is known to construct adhesive-applying apparatus in the form of a hollow cylinder with a continuous wall slot extending parallel to the longitudinal axis which is covered with thin metal foils at the locations not used for application of the adhesive. At the locations not covered with a foil, the adhesive present in the application cylinder can thus pass outwardly to the workpiece. The use of such known apparatus is limited, being restricted particularly to those purposes which require the use of highly viscous adhesives as is the case, for example, in the manufacture of self-adhesive postcards. Adhesives of low viscosity could easily issue from the slot, particularly during work intervals.

In hand-operated adhesive-applying tools it is also known to stretch a foil over the whole width of the application tool, and to connect it to a hand-operated locking member. The foil has at least one opening which in one end position of the foil overlaps with the discharge slot and thus permits application of the adhesive, and which in the other end position is remote from the slot so that in that end position the discharge slot is closed by the foil area. It has been found that movable stamped-in foils are subject to disproportionately rapid wear and, more particularly, are extremely liable to tear at the stamped positions. Moreover, displacement of the foil causes it to be tensioned, resulting in detrimental lateral contraction particularly at the stamped locations.

It is also known to stretch and hold in position a plurality of strips of foil over a substantially cylindrical application tool. The cylinder contains an eccentric bore which is closed by a cock. Both the cock and the wall of the cylinder are provided with exactly registering slots. Upon being turned, the cock constitutes an independent closure for the application tool, so that the foil is merely provided for the purpose of forming a boundary at the edge of the streaks of adhesive applied.

It has been found that these known application tools give rise to difficulties, particularly where a plurality of application tools are to be disposed side by side at the same level, as is, for example, frequently the case in the treatment of paper. The individual tools of known construction require separate control members, unless a single, rather wide application tool extending over the whole web of the article to be coated with the adhesive is provided, this being, however, particularly disadvantageous for the reason that such large application tools cannot be manufactured with adequate accuracy; moreover, the pressure of the adhesive develops irregularly over the length of the application slot, and the coating applied therefore varies in thickness.

It is a primary object of the invention to permit a plurality of application tools disposed side by side to be started and stopped by a single operating device without affecting the quality of the coating as a whole. It will be understood that my present improvement can advantageously also be used in those cases where a single application tool may be used.

I have now found that particular advantages may be afforded if the hollow application tool or dispenser is rotatably guided in a holder, and at least one stationary foil is provided on that holder. At a location substantially opposite the discharge opening, the application tool is provided with a recess in which engages a locking member in the form of an elongated blade which is rotatable on a shaft extending parallel to the axis of the dispenser body. Unexpectedly it has been found that the fixed foil according to the invention is much less subject to wear than are the known rotatable foils, and that, by virtue of the specific construction of the apparatus, the application tool may now be readily operated by a single adjusting device, irrespective of the position occupied by the application tool along its holder and the number of such tools provided thereon.

In accordance with the invention, the application tool is advantageously constructed as a hollow cylinder through which extends a feeder tube in the form of a hollow bolt which is held against rotation, whose wall is provided with holes at locations internally of the application tool, and whose ends project beyond the bearings of the application tool and serve as connections to a fluid-feeding conduit. In this manner, the working fluid, preferably an adhesive, may be supplied from a large storage tank independently of the mounting of the application tool. In this manner, furthermore, the difficulties of mounting and sealing the application tool are also easily solved, because discharge of adhesive at the bearings is avoided by the secure connection of the cylindrical dispenser body and the feeder tube taking, for example the form of a force fit.

It has been found to be particularly advantageous for the elongated locking member to be connected to a shaft extending in the interior of a hollow transverse support which is open at one end and on which the movable application tool is mounted. Thus, as the locking member extends over the entire width of the apparatus, the application tool can be moved as desired along the hollow transverse support without requiring any resetting of the control device.

It has been found to be advantageous for the hollow transverse support to be in the form of a prismatic or cylindrical tube which is open at one end. Where a cylindrical tube is used, the shaft of the locking member in the transverse support may extend over its entire length. In accordance with a feature of the invention, the holder for the application tool may be provided with two sliding jaws which are connected to the bearing brackets for the tubular feeder rod or bolt and are guided on the hollow nonrotatable transverse support which is movable in the axial direction. The application tool may advantageously be connected to the hollow transverse support by a micro-adjustment device by which the supporting tube traversed by the locker shaft can be moved in a direction perpendicular to its axis. In one advantageous construction, the micro-adjustment device includes a box nut which is secured to the sliding jaws and, guided in the box nut, an adjusting screw which is secured against dropping out by cup springs, and which may be turned in relation to the supporting tube in a direction perpendicular to the axis thereof. If the transverse support is cylindrical, it may be secured against rotation by a key which in turn may be held in position by a retaining bolt which is passed through the adjusting screw.

This method affords the particular advantage that the application tool may be supported, adjusted, and given a certain resilience by a single device, such resilience being of particular importance where it is possible that the article to be coated may have unevennesses, such as crease lines, which otherwise would obstruct the application tool.

In a specific embodiment more fully described hereinafter, the ends of the foil are provided with turnbuckles or tie rods which are supported by the aforementioned sliding jaws. The turnbuckles or tie rods permit adjustment of the foils to the desired friction ratio with reference to the application tool, so that turning of the application tool is not made unnecessarily difficult, and in addition it is ensured that the slot is efficiently sealed by the foil. In accordance with another feature of the invention, a tensioning member may engage the sliding jaws and may be adjustable by a nut carried on the transverse support.

In a further construction according to the invention, the shaft carrying the locking member may be connected to a device by which a slight vacuum is generated by which the working medium is sucked back from the discharge opening. Thus when the shaft is turned with resultant closing of the application tool, the liquid substance in the feed conduits is simultaneously drawn toward the storage tank, and the pressure is thus kept away from the foil closure.

Particular advantages may also be afforded by using a resistant synthetic resin, for example polyamide, for the manufacture of the application tool, thus improving the friction ratio with the foil and moreover preventing corrosion.

One construction according to the invention is diagrammatically illustrated by way of example in the accompanying drawing, in which.

Figure 1:
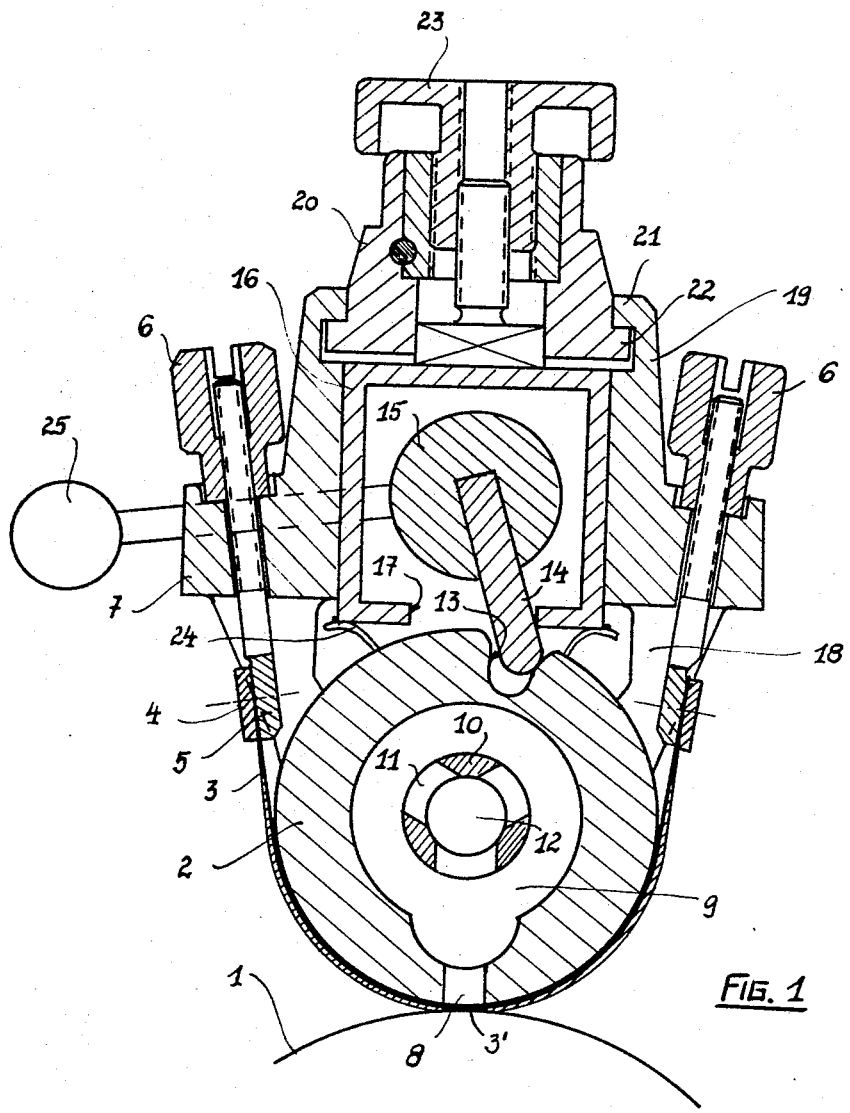
FIG. 1 is a cross-section through an apparatus for the application of liquid substances, particularly adhesives, and its adjusting device.

In the construction illustrated in FIG. 1, the article to be coated, for example a web of paper, is passed over a shaft or other support 1. The construction of the fluid-applying tool (for the sake of simplicity, the working medium is hereinafter referred to as the "adhesive") is such that it is pressed against the support 1 with a higher or lower pressure which should be adjustable, if possible. The application apparatus shown in FIG. 1 includes a rotatable hollow application tool 2 whose wall has a discharge opening 8 through which the adhesive is discharged. The rotatable dispenser or application tool 2 is enclosed by a foil 3, which is similarly provided with an opening 3' in the zone of the discharge slot 8. The ends of the foil 3 are secured in position by clamping members 4, 5, the clamping member 5 serving also as a turnbuckle which which is braced against an abutment by a nut 6. The opening 3' of the foil 3 is thus maintained in a stationary position at the nadir of the depending loop which is formed by the foil and wherein the dispenser 2 is rotatably cradled.

When the application tool 2 is turned about its axis, the discharge opening 8 of the application tool 2 no longer coincides with the opening 3' in the foil 3, and application of the adhesive stops. The application tool 2 has a hollow interior 9, which is filled with adhesive. The adhesive passes into the space 9 through a hollow bolt 10 whose walls are provided with openings 11. The boring 12 in the bolt 10 extends to the outside at least at one end which has a connecting socket for an adhesive-feeding conduit. Advantageously both ends are provided with connecting sockets, so that the adhesive may also be removed, e.g. by suction, from the application tool 2. Thus, the conditions are provided for circulation of the adhesive, and for washing with water or with a solvent for cleaning purposes, as diagrammatically indicated by arrows in FIG. 3. It should also be noted that the hollow bolt 10 is advantageously pressed into the application tool 2; the bolt is supported and is thus effective to seal off its bearing from the adhesive.

The rotatable application tool 2 is provided at a location substantially opposite the discharge opening 8, with a notch-like recess 13 in which engages a locking member 14 in the form of an elongated blade which is connected to a rotatable shaft 15. The shaft may be turned by means of an adjusting lever 25. The rotatable application tool 2 is driven by a rotating motion of the shaft 15, irrespective of the axial position occupied by the tool in relation to the shaft 15. The shaft 15 is mounted internally of a hollow transverse support in the form of a horizontal beam 16 serving both as a holder for the total application apparatus and as an adjusting member. In the zone of the locking member 14, the hollow transverse support 16 has a longitudinal gap 17 to permit rotation of the locking member 14. The hollow transverse support 16 may also be pivotally mounted thus permitting the application apparatus to be swung away from the support 1. The rotatable application tool 2 and the hollow bolt 10 are connected by bearing brackets 26 (FIG. 3) through connecting ribs 18 to sliding jaws 19 guided on the hollow transverse support 16. If the hollow transverse support 16 is of prismatic section, as illustrated in FIG. 1, the application apparatus is prevented from turning about its shaft 15. At the same time, the application apparatus can be moved along the hollow transverse support 16 and adjusted. The construction illustrated in FIG. 1 is, however, provided with an adjusting device 20–23 by which it is ensured that the application tool is pressed against the support 1 with an adjustable pressure. Inserted between the application tool 2 and the hollow section 16 is a spring unit 24 which consists mainly of laminated springs. The spring unit is effective to urge the rotatable application tool 2 against the support 1. However, when the nut 23 is turned, the sliding jaws 19 are moved by the member 20 in the direction of the nut with the result that the rotatable application tool 2 is lifted from the support 1. Counter-shoulders 22 in tensioning member 20 engage behind corresponding shoulders 21 of the sliding jaws 19 in order to ensure that the sliding jaws 19 are taken along when the nut 23 is turned.

Figure 2:
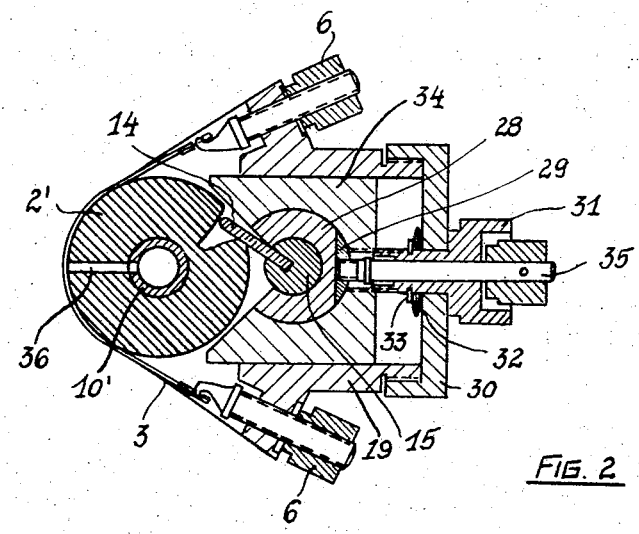
FIG. 2 is a cross-section through a modification of the construction illustrated in FIG. 1.
Figure 3:
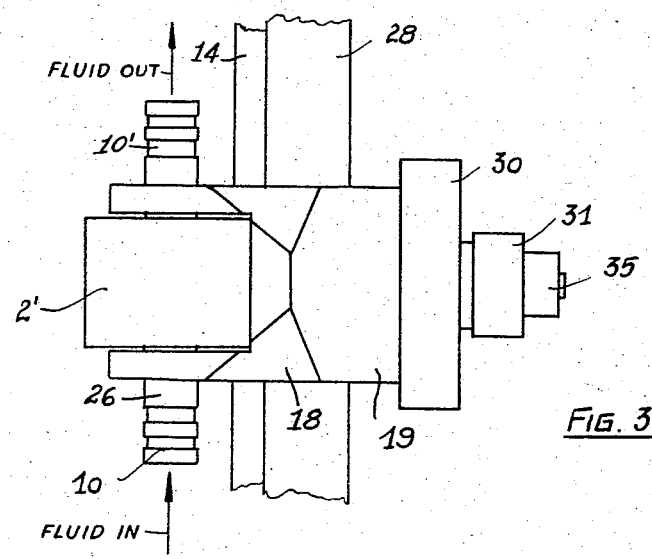
FIG. 3 is a plan view of the apparatus according to FIG. 2.

FIG. 3 shows clearly that the application tool may occupy any position on the hollow transverse support 16 which is designated 28 in FIGS. 2 and 3. The drawing shows particularly clearly that the locking member 14 extends over the whole working width of the apparatus. The application tool 2 may be turned at any position occupied by the application tool along the supporting beam 28 without requiring any resetting of the adjusting device.

It will be readily understood that individual features of the disclosed structure may be varied as desired. Thus, for example, the prismatic hollow transverse support 16 shown in FIG. 1 may be replaced by any other support, such as a tubular beam 28 of FIGS. 2 and 3 which, e.g. by means of a key 29, has, however, to be secured against turning relatively to the application tool 2. Instead of using the adjusting devices 20–23, any other construction may be used. It is, however, important to note that fine adjustment of the application tool in relation to the support 1 can be effected in this way.

Thus, for example, FIG. 2 shows the provision of a box nut 30 which is connected to the sliding jaws 19 and by which an adjusting screw 31 is guided. The screw 31 is secured against accidental disengagement by cup springs 32 and a snap ring 33. A sliding member 34 is guided on the cylindrical hollow transverse support 28 on the surfaces of which the sliding jaws 19 are guided. Fine adjustment of the application tool 2 is effected by threaded engagement between the adjusting screw 31 and the threads of the sliding member 34. The sliding member 34 is secured against rotation by the key 29 with fixing screw 35.

The modified dispenser tool 2' of this embodiment is made of a resistant synthetic resin, e.g. polyamide. The hollow bolt 10' is pressed into a cylindrical bore of the otherwise solid body 2'. A radial bore 36 extends to the discharge opening 8.

What I claim is:

1. A device for applying a fluid to a work surface, comprising a stationary beam; a holder slidably and nonrotatably carried on said beam; a foil supported on said holder and forming a laterally projecting loop thereon, said foil being provided with an opening at a portion of said loop remote from said beam; a dispenser having a substantially cylindrical body with an axis parallel to said beam rotatably cradled in said loop, said body being provided with a peripheral bore registering with said opening in an operative position of said dispenser; feed means for supplying a working fluid to the interior of said body; a rotatable shaft supported on said beam and extending in the direction of the latter; an elongated blade peripherally carried on said shaft, said body having a peripheral formation engaged by said blade in different axial positions of said dispenser and said holder with reference to said beam; and actuating means connected with said shaft for swinging the latter about its axis, thereby rotating said body into an inoperative position in which said bore and said openings are disaligned.

2. A device as defined in claim 1 wherein said feed means comprises a tube rigid with said body and passing axially therethrough, said tube being apertured within said body for the discharge of working fluid into same.

3. A device as defined in claim 2, further comprising bearing means for said tube fixedly supported on said holder.

4. A device as defined in claim 3, further comprising tensioning means for said foil on said holder.

5. A device as defined in claim 3 wherein said holder is movable on said beam in a direction perpendicular to said axis, further comprising pressure means adjustably interconnecting said beam and said holder for urging said body against said foil through the intermediary of said beam.

6. A device as defined in claim 5, further comprising spring means interposed between said body and said beam.

7. A device as defined in claim 1 wherein said beam is hollow and provided with a longitudinal peripheral gap, said shaft being disposed inside said beam with said blade extending outwardly through said gap.

8. A device as defined in claim 7 wherein said formation is an external peripheral recess in said body confronting said gap.

References Cited by the Examiner

UNITED STATES PATENTS

| 1,851,538 | 3/1932 | Day et al. | 118—410 X |
| 2,833,242 | 5/1958 | Neidich et al. | 118—411 X |
| 2,917,272 | 12/1959 | Kollman et al. | 118—25 X |

FOREIGN PATENTS

| 447,219 | 5/1936 | Great Britain. |

CHARLES A. WILLMUTH, *Primary Examiner.*

J. P. McINTOSH, *Assistant Examiner.*